Feb. 18, 1964    W. J. MATTOX ETAL    3,121,754
CATALYTIC PROCESS
Filed June 13, 1958
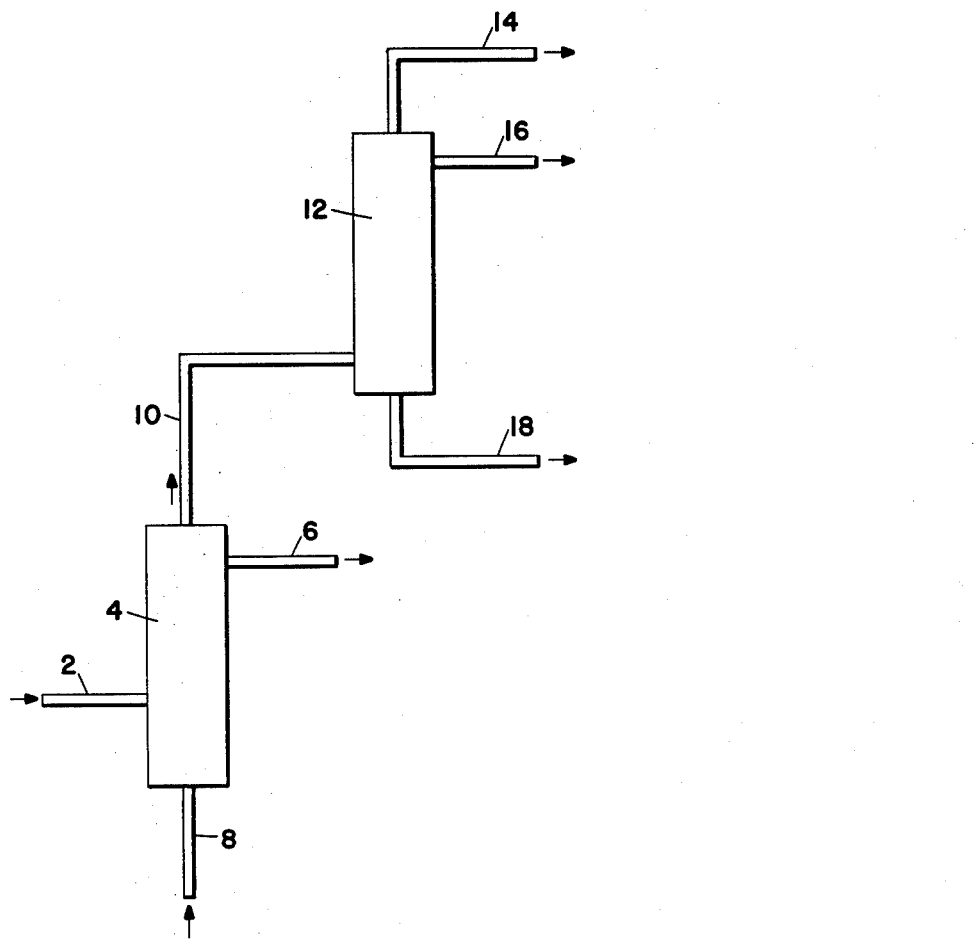
William Judson Mattox   INVENTORS
Elroy Merle Gladrow
BY *Richard H. Nagel*   ATTORNEY United States Patent Office 3,121,754
Patented Feb. 18, 1964

3,121,754
CATALYTIC PROCESS
William Judson Mattox and Elroy Merle Gladrow, Baton Rouge, La., assignors to Esso Research and Engineering Company, a corporation of Delaware
Filed June 13, 1958, Ser. No. 741,881
9 Claims. (Cl. 260—672)

The present invention relates to the improvement in catalytic conversions of hydrocarbons. More particularly, the present invention relates to the upgrading of hydrocarbon streams in the presence of a composition which is at once a powerful highly selective adsorbent and a hydrocarbon conversion catalyst. Still more particularly, the present invention relates to a process involving a composition which is an adsorbent and a catalyst wherein adsorption is carried out in one stage and conversion in another.

It is known in the art to improve the quality of hydrocarbons, particularly petroleum hydrocarbons, by treating them with catalysts under various operating conditions to effect such reactions as cracking, hydrocracking, reforming, hydroforming, aromatization, isomerization, hydroisomerization, polymerization, alkylation, hydrogenation, dehydrogenation, and dealkylation, to name but a few. For example, it is well-known to treat petroleum oils boiling in the range of about 400° to 1000° F. with silica-magnesia or silica-alumina catalyst at temperatures in the range of about 600° to 1100° F. to crack these oils and obtain valuable fractions suitable as motor oils and fuels. Similarly, it is known to alkylate isoparaffins with silica-alumina cracking catalyst. It is also known that synthetic porous solids, comprising silica and one or more metallic oxides, such as alumina, magnesia, zirconia, beryllia, boria and others, have catalytic properties for the treatment of petroleum hydrocarbons.

An important problem in catalytic conversions generally is the fact that rarely are there feeds available to which the catalyst is ideally suited. Many feeds contain, to a greater or less extent, impurities which tend to inactivate the catalyst or prevent the reaction from going at all, or cause formation of secondary reaction products. For example, a small amount of benzene in the feed to a Friedel-Crafts isomerization process practically completely inhibits the reaction. As another example, gas oils employed as feeds to the well-known catalytic cracking process in general contain aromatic constituents which are highly refractory, form much carbon on the catalyst and rapidly deactivate it. Shale oil, a commodity of great future importance, contains large quantities of combined sulfur and nitrogen compounds which are deleterious to cracking catalyst. Numerous other examples may be named.

Refining processes for purifying process streams are numerous, and involve generally some means of destroying the impurity, like acid treatment or hydrogenation or similar step. Other means, such as absorption and adsorption, generally involve the recovery, if any, of a low grade material. To upgrade this material would generally require at least another step, generally in the presence of a catalyst.

In accordance with the present invention, the processing of streams, in particular for catalytic conversion processes, is simplified and high process advantages realized by employing as a process stream purifier or concentrator an adsorbent that is at once an adsorbent and a catalytic agent, but whose catalytic activity can be controlled so that under one set of conditions the composition acts merely to remove the undesired component from a particular stream and under a second set of conditions the adsorbate is catalytically converted to other compounds or reacts catalytically with an added reagent. As an illustration, the adsorbent may be employed to remove aromatics, and in particular alkylated aromatics, from petroleum streams, and in a second stage the adsorbed alkylated aromatics are hydrodealkylated in the presence of the adsorbent which here acts as a hydrodealkylation catalyst, to form a high octane gasoline component.

The adsorbent-catalysts employed in the process of the present invention are a class of natural or synthetic crystalline alumino-silicates having a uniform pore opening of 6 to 15 Angstrom units. This material has a high affinity for polar hydrocarbon compounds, in particular olefins and aromatics, and has pore size large enough to admit the relatively large aromatic molecules. These crystalline zeolites, which may have assigned them the empirical formula

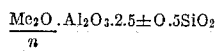

where Me is a metal and $n$ its valence, may readily be prepared by mixing and heating sodium aluminate and sodium silicate under carefully controlled conditions of temperature and heating time and silica/alumina ratios in the reagents, to produce a crystalline product which is subsequently dehydrated under conditions to preserve the crystalline structure. The sodium content of the zeolite may then be replaced, if desired, by ion exchange with an appropriate metal salt, particularly of groups II, III and IV. The metal ion influences the size of the pore openings, as does the ratio of reagents and reaction conditions.

The catalyst prepared in this manner has an aluminosilicate ionic cage structure in which the alumina and silica tetrahedra are intimately connected to each other. Hydrogen or various metal cations are distributed throughout the structure to maintain electrical neutrality. The dispersion of silica and alumina tetrahedra is highly ordered, thereby making for a maximum number of active sites, necessary for catalytic activity. The uniform pore openings, of about 6 to 15 and usually 10 to 13 Angstrom diameter, allow for easy ingress of all hydrocarbon feed and egress of the reaction product.

The adsorbent-catalyst employed in the present invention is a crystalline alumino-silicate as mentioned, and can be base exchanged with numerous metals or hydrogen cations, each of which may affect its catalytic properties. In this respect it resembles zeolites, some of which are known to possess activity as catalyst. However, the adsorbent-catalyst employed in the present invention may be readily distinguished over the zeolite art by the exceptionally uniform pore openings.

Alumino-silicates of high adsorptive capacity and conversion activity may be prepared by mixing and heating sodium aluminate and sodium silicate, preferably sodium metasilicate under carefully controlled conditions of temperatures, concentrations, and alkalinity, to produce a crystalline product which is subsequently dehydrated under conditions to preserve the crystalline structure. The sodium content of the alumino-silicate may thereafter be replaced at least in part by effecting ion exchange with the appropriate metal salt, such as magnesium, nickel or cobalt.

The preparation of the catalyst involves the maintenance of several rather critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either not be crystalline, or it will have little or no adsorptive properties, the pores will not be uniform, or the pores, if uniform, will be too small to admit any but small diameter molecules. If the conditions are observed, the pores will be large enough to admit most organic molecules, and will be between 6 and 15 Angstroms.

The ratio of $Na_2O/SiO_2$ in the silicate employed must be at least 0.5/1, but may be as high as 2/1. Preferably, the ratio is 0.7/1 to 1/1, and the desired reagent is sodium metasilicate. If waterglass is employed, additional caustic must be present.

The composition of the sodium aluminate is less critical. Sodium aluminates having any ratio of soda to alumina in the range of 1/1 to 3/1 may be employed; however, a sodium aluminate having a high ratio of soda to alumina is preferred, and a sodium aluminate having the ratio of about $1.5/1$ $Na_2O/Al_2O_3$ is particularly desirable. The amounts of sodium silicate solution and sodium aluminate solutions are such that the mol ratio of silica to alumina in the final mixture is at least 2.2/1, and preferably 2.5–4/1. However, silica to alumina ratios as high as 10/1 may be employed.

The method of mixing the sodium metasilicate and sodium aluminate solutions must be carried out in a manner allowing formations of a precipitate having a uniform composition. A good method is to add the aluminate to the silicate at ambient temperatures using rapid and efficient agitation to make a homogeneous paste. Thereafter, the mixture is heated to about 180° to 215° F. for a period up to 200 hours or more to ensure crystallization in the form having interstices large enough to adsorb isoparaffinic and aromatic molecules. The heat-soaking step is essential; however, heating at temperatures of about 350° F., and higher does not produce a crystalline composition having the desired uniform size pore openings.

A general scheme for preparing the hydrocarbon conversion catalyst is as follows: A solution of sodium metasilicate is prepared, having a concentration of 30 to 300 grams, preferably 100 to 200 grams/liter. Similarly, a solution of sodium aluminate having an $Al_2O_3$ concentration of 40 to 400 grams, preferably 200 to 300 grams, is prepared. The amounts of metasilicate and aluminate solutions employed are such that the ratio of $SiO_2/Al_2O_3$ in the final mixture is 2.2/1 to 10/1, preferably 2.5/1 to 4/1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours, and shorter at higher temperatures, although long heating times may be employed without producing any deleterious effects.

The crystalline product resulting from the heat-treating step is then preferably reacted with the salt of a metal of the type previously enumerated to prepare the active catalyst, though for some catalytic purposes the sodium form itself may be employed. In the latter case, the crystalline material is waterwashed, filtered, and heat activated by calcination at 400° to 1000° F., preferably about 700° to 900° F. The crystalline sodium alumino-silicate formed during the heat soaking period has the stoichiometric composition of $Na_2O.Al_2O_3.2.5\pm0.5SiO_2$. In the majority of cases, however, it is desirable to convert the sodium form of the alumino-silicate crystal to a more active form. For this purpose, the sodium crystals are reacted with metal salt solutions that enhance the catalytic behavior. These metals are of the type already enumerated, and may further include cobalt, nickel, copper, calcium, magnesium, chromium, iron, silver, gold, platinum, zinc, cadmium, rare earths, mercury, lead and the like. It is not necessary to carry the base exchange reaction to the extent of complete removal of all the sodium. It is necessary to replace only about two-thirds of the sodium ions with the desired metal ion, although further base exchange is not deleterious. The remaining sodium in the crystalline zeolite structure is difficult to replace, and has no apparent effect on either the adsorption or catalytic properties of the base exchanged material. For hydrocarbon conversion catalysts of the cracking or alkylation type, it is particularly desirable to exchange the sodium with magnesium; for aromatization, with chromium or zinc or platinum or palladium; for hydroforming or hydrodesulfurization, with cobalt, iron, or platinum.

When reacting the crystalline sodium alumino-silicate with another metal salt solution, it is only necessary to replace about two-thirds of the soda with the other metal oxide. The removal of more soda than this does not bear too great an influence on the behavior of the crystals as catalysts. In the specific case of the magnesium form of the alumino-silicate, the relative stoichiometric composition is about $0.33Na_2O.0.67MgO.Al_2O_3.2.7SiO_2$.

By modifying the conditions of synthesis, it is possible to obtain crystals having pores between about 3 and 5 Angstroms diameter. Other metal forms of this crystalline sodium alumino-silicate may be prepared in a manner identical with the above 6 to 15 A. pore diameter crystal. The reactions which the 3 to 5 A. pore diameter catalyst will promote are identical with the same metal form of the 6 to 15 A. pore diameter material. However, the 3 to 5 A. pore diameter crystals will not allow any but straight chain paraffins and olefins to enter the interior of the pores which present the active catalyst sites. Thus, branched chains, acyclics and all ring hydrocarbons are excluded from the catalytic sites, thus restricting the versatility and usage of this material as a catalyst. For the same reason as was advanced for high carbon deposits in the minute pores with gel type catalysts, the 3 to 5 Angstrom pore diameter crystals also yield relatively large amounts of catalytic coke. This limits the use of the 3 to 5 Angstrom material as a catalytic agent.

The process of the present invention will be more readily understood in reference to several specific systems wherein the crystalline zeolite is employed in the first instance to remove a component from a process stream and thereafter act as catalyst for the upgrading of the removed component.

Thus, as has been pointed out, aromatic compounds present in gas oils are refractory and high carbon formers in catalytic cracking reactions. In one embodiment of the present invention, a gas oil stream is passed, preferably at a temperature of about 400° to 650° F., through a bed of zeolite, preferably a zeolite having nickel or cobalt as the base exchanged ion. The treatment with the zeolite is highly effective in reducing the aromatics content of the effluent stream to an extremely low figure, and sometimes substantially to zero. Thereafter, either in the same zone, or in a second zone, the zeolite plus the adsorbed hydrocarbons is treated with hydrogen gas under hydrocracking conditions of 700° to 1000° F. reaction temperature, 500 to 10,000 p.s.i. pressure, 2,000 to 8,000 c.f./b. of hydrogen, and feed rates of 0.1 to 5 volumes/volume of catalyst per hour. The pressures employed for hydrocracking are considerably higher than required for hydrodealkylation. Under these conditions the adsorbed aromatics are catalytically converted to naphthenes and/or lower molecular weight by hydrogenated products which are either suitable as gasoline components themselves or as cracking stock, in which case they are returned to the catalytic cracking zone.

In another embodiment of the present invention, which is described in the accompanying drawing, cobalt or nickel forms of the zeolite, which are prepared for hydrogen-involving reactions, are employed to adsorb alkylated aromatics from heavy naphthas and kerosene. These alkylated aromatics are particularly undesirable in the back ends of motor gasoline, and are heavy contributors to carbon formation in the combustion chamber of automotive engines. In kerosene they cause smoky flames. These streams, or again gas oil or lubricating oil fractions, may be effectively scrubbed of aromatic constituents at relatively low temperature and the adsorbent treated at elevated temperatures under hydrodealkylation conditions to convert adsorbed alkylated aromatics into nuclear aromatics, which are excellent automotive fuels.

Turning now to the figure, a heavy catalytic naphtha stream boiling in the range of about 200° to 400° F. and which may contain 10 to 20% alkylated aromatics, is passed via line 2 into adsorption zone 4. The feed is preferably preheated to a temperature of 400° to 450° F. and is also dried before passage into the adsorber. Within vessel 4 there is maintained a bed of the crystalline zeolitic adsorbent hitherto described, preferably as the nickel or cobalt form. The material may be disposed on trays, or supported or unsupported. Though the adsorption step may be carried out under liquid or mixed phase condition, it is preferred, where possible, to maintain the feed as a vapor. Conditions for adsorption for this feed include temperatures of 300° to 500° F., pressures of atmospheric to 50 p.s.i.g., and feed rates of 0.2 to 5 volumes/volume of adsorbent per hour. There is withdrawn from vessel 4 a stream through line 6 substantially depleted in aromatics.

When the bed becomes saturated with aromatics, which may readily be determined by analysis of the effluent through line 6, the flow through line 2 is halted and feed diverted to a parallel adsorber. Hydrogen gas is now introduced through line 8 and the temperature within vessel 4 increased to about 800° to 900° F. A pressure of 2,500 to 4,000 p.s.i.g. is applied, and under these conditions, the hydrodealkylation reaction predominates.

Product is removed via line 10 and passed to distillation zone 12. Hydrogen and fixed gases are withdrawn through line 14, while paraffins corresponding to the alkyl constitutent are withdrawn through line 16. The aromatic fraction recovered as a bottoms product through line 18 is markedly depleted in alkylated aromatics or in alkylated aromatics having more than one carbon atom per alkyl group.

In still another embodiment of the present invention, harmful aromatics are removed from an isomerization feed stock such as light virgin naphtha. In the Friedel-Crafts isomerization of the normal pentane to heptane fractions in the presence of an aluminum halide catalyst, small amounts of benzene, more than about 0.1%, cause catalyst deactivation. The use of the zeolite alone to recover and remove aromatics is not entirely adequate, because although aromatics are selectively adsorbed, nonetheless in the presence of the high partial pressure of paraffins, equilibrium considerations cause some aromatics to appear in the effluent to isomerization.

In accordance with this embodiment of the invention, advantage is taken of the alkylation activity of the zeolite, and a $C_2$ to $C_4$ olefin stream is passed into the adsorption zone in amounts sufficient to alkylate the adsorbed aromatic. The higher boiling alkylated aromatic is retained on the zeolite more firmly than the unalkylated aromatic. Suitable temperatures for the adsorption alkylation are in the range of about 250° to 700° F. at moderate pressures. The alkylated aromatics are then treated in a second stage under hydrodealkylation conditions as hitherto described.

In still another embodiment of the present invention, it may be desirable to concentrate aromatics or isoparaffins, or both, from hydrocarbon streams, and thereafter, with the same zeolitic adsorbent, effect a catalytic reaction such as alkylation. For example, the zeolite may be used to concentrate the aromatic constituent from such material as straight run, thermal, or catalytic naphthas, in which the aromatic content is quite low. Similarly, aromatics can be adsorbed from hydroformates or aromatized naphthas. Also similarly, olefinic reactants for an aromatics alkylation process can be concentrated from a variety of feeds.

The alkylation reaction is then preferably carried out in the presence of one of the components adsorbed on the zeolite. Thus, if the aromatic has been adsorbed from a naphtha stream, an olefin such as propylene or butylene is passed into the adsorber vessel. Temperatures are raised from adsorption temperatures of 300° to 450° F. to alkylation temperatures of 300° to 800° F., preferably 400° to 750° F., and pressure of atmospheric to 1000 p.s.i.g. Under these conditions, alkylation of the aromatic readily occurs, and the alkylated aromatic recovered as by steaming.

The process of the present invention may be further illustrated by the following specific examples.

EXAMPLE 1

The nickel form of the zeolite prepared in a manner similar to that described above was employed in the dealkylation of ethyl benzene at 400 p.s.i.g. and 5000 c.f./b. of added hydrogen. The following tabulation summarizes the results of tests made at 900° and 1100° F.

*Hydrodealkylation of Ethyl Benzene Nickel Form Alumino-Silicate Catalyst*

[400 p.s.i.g.; 5000 c.f./b. $H_2$; 0.5 v./hr./v. Feed]

| Temperature, °F | 900 | 1,100 |
|---|---|---|
| Yields, Wt. percent of Feed: | | |
| Total Liquid Product | 99.3 | 45.0 |
| Gas | | 44.7 |
| Coke | <1 | 10.3 |
| Unaccounted | | |
| Benzene and Toluene | 17.7 | 24.6 |
| Liquid Product Composition: | | |
| Benzene | 9.5 | 34.0 |
| Toluene | 8.3 | 20.7 |
| $C_8$ Aromatics | 78.7 | 43.5 |
| $C_9$ Aromatics | 0.6 | 0.6 |
| $C_{10}$ Aromatics | 2.4 | 0.2 |
| Other Aromatics | 0.5 | 1.0 |
| Paraffins | 0.0 | 0.0 |
| Naphthenes | 0.0 | 0.0 |
| Gas Composition: | | |
| Percent Hydrocarbons in Exit Gas | 4.3 | 60.4 |
| Comp. of Hydrocarbon Components— | | |
| $CH_4$ | 94.2 | 52.9 |
| $C_2H_4$ | 0.1 | 0.5 |
| $C_2H_6$ | 4.5 | 21.6 |
| $C_3H_6$ | 0.1 | 18.1 |
| $C_3H_8$ | 0.3 | 2.4 |
| $C_4H_{10}$ | 0.2 | 0.7 |
| $C_5+$ | 0.6 | 3.8 |

These data show that at 900° F. the dealkylation reaction is very selective, giving about 82% selectivity among the converted products to toluene and benzene. At the higher temperature of 1100° F. considerable hydrodealkylation was obtained but high ring cracking activity was also obtained as evidenced by the high yields of dry gas and coke. However, examination of the liquid product showed very little converted product other than benzene and toluene. Also, the make gas was about 75% $C_1$ and $C_2$. It appears from these two sets of data that a desired temperature range is about 950° F. to 1050° F.

The data attest to the efficacy of the nickel form of zeolite to carry out the hydrodealkylation reaction. In summary, this is to selectively adsorb aromatic ring compounds from a stream at relatively low temperatures and then, by raising temperature, hydrodealkylate the adsorbed aromatics to yield principally high octane number aromatic components and/or aromatic feed streams for chemical processes.

EXAMPLE 2

It has been pointed out that either benzene or an olefin such as propylene may be scrubbed out of a process stream and the adsorbed material reacted at elevated temperatures with either benzene or propylene in the presence of the zeolite. Thus, benzene and propylene in a mol ratio of 1.5/1 were passed at atmospheric pressure and 400° F. over a fixed bed of crystalline sodium alumino-silicate. In the first experiment, the crystalline sodium alumino-silicate had a pore opening of 4 Angstrom units. In the second experiment, the pore opening was 13 Angstrom units.

*Alkylation of Benzene With Propylene Sodium Alumino-Silicate Catalysts*

[Temp. 400°F.; pressure atm.; $C_6H_6/C_3H_6$ mol ratio 1.5/1]

| Test No. | 1 | 2 |
|---|---|---|
| Alumino-Silicate Catalyst: | | |
| Pore Opening, A. | 4 | 13 |
| Composition | $Na_2O.Al_2O_3.2SiO_2$ | $Na_2O.Al_2O_3.2.5SiO_2$ |
| Reaction Product: | | |
| Isopropylbenzene, Vol. Percent | 0 | 7.5 |
| Polyisopropylbenzene, Vol. Percent | 0 | 1.4 |
| Alkylate: | | |
| Isopropylbenzene, Vol. Percent | 0 | 83 |
| Polyisopropylbenzene, Vol. Percent | 0 | 17 |

These data show clearly that it is not enough to employ a zeolite for the alkylation catalyst, but a zeolite having pore openings large enough to admit the reactants. A 4 Angstrom pore opening is too small for this purpose and thus no product was obtained. On the other hand, with the 13 Angstrom pore openings, 83% of the alkylation product that was obtained was mono-alkyl aromatic. To produce alkylated product containing this high a percentage of cumene with phosphoric activated-kieselguhr catalyst (900 p.s.i. and 525° F.) requires a benzene to propylene mol ratio of 4/1 and a correspondingly high recycle of benzene.

EXAMPLE 3

A 150° to 200° F. cracked naphtha fraction having a bromine number of 102, which corresponds to about 58% unsaturates, was vaporized and passed at 240° F. over a sodium alumino-silicate ($Na_2O.Al_2O_3.2.5SiO_2$) having 13 Angstrom pore openings. After 40 cc. of naphtha had been fed per 100 grams of the alumino-silicate, the feed was interrupted and the adsorbed hydrocarbons recovered by steaming at 240° F. The operation was then repeated with freshly dehydrated alumino-silicate. In this second test, following the adsorption at 240° F., the adsorbent-catalyst was heated without any gas flow through the bed to 600° F. Steam was then passed through the bed to effect hydrocarbon recovery. The following tabulation shows the pronounced effect of the higher temperature on the conversion of the adsorbed olefin concentrate to aromatics.

*Adsorption-Conversion of Olefins to Aromatics*

[150°–200°F. cracked naphtha feed; atm. pressure]

| Test | Feed | 1 | 2 |
|---|---|---|---|
| Operation | | Adsorption | Adsorption-Aromatization |
| Adsorption Temp., °F | | 240 | 240 |
| Naphtha Feed: | | | |
| Rate, v./v./Hr | | 0.2 | 0.2 |
| cc./100 g. catalyst | | 40 | 40 |
| Desorption Temp., °F | | 240 | 600 |
| Desorbed Hydrocarbons: | | | |
| cc./100 g. catalyst | | 16 | [1] 10 |
| Percent Olefins | 58 | 92 | |
| Percent Aromatics | 6 | 8 | 91 |

[1] An additional 3 cc./100 g. catalyst desorbed during heating to 600° F. of intermediate aromatic content and suitable for recycle or aromatics concentration, etc.

What is claimed is:

1. An improved process for upgrading a hydrocarbon composition containing at least two hydrocarbon components which comprises contacting a fluid stream of said hydrocarbon composition with a crystalline metallic aluminosilicate zeolite having uniform pore openings of about 6 to 15 Angstrom units in an adsorption zone under conditions including temperatures up to about 700° F. to effect a selective adsorption of at least one hydrocarbon component contained in said hydrocarbon composition whereby at least a portion of said hydrocarbon composition is unadsorbed on said zeolite, withdrawing the unadsorbed portion of said hydrocarbon composition from said adsorption zone and thereafter subjecting said hydrocarbon component selectively adsorbed on said zeolite to a catalytic conversion reaction in the presence of said zeolite as the sole catalyst.

2. The process of claim 1 wherein said zeolite has the empirical formula

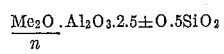

$$\frac{Me_2O.Al_2O_3.2.5\pm0.5SiO_2}{n}$$

where Me is a metal ion selected from groups I, II, III, IV, VIII, and $n$ is the valence of the cation.

3. The process of claim 2 wherein said fluid stream contains aromatics dissolved in non-aromatic hydrocarbons.

4. The process of claim 2 wherein said adsorption stage is maintained at a lower temperature than said catalytic stage.

5. An improved process for upgrading a petroleum fraction containing alkylated aromatic hydrocarbons which comprises passing a vaporized stream of said fraction into an adsorption zone, maintaining in said zone a bed of crystalline metallic alumino-silicate zeolite having a uniform pore opening of from 6 to 15 Angstroms, maintaining a temperature of from about 300° to 600° F. in said zone, adsorbing alkylated aromatics from said stream, withdrawing unadsorbed hydrocarbons from said zone, thereafter treating said aromatics adsorbed on said zeolite with hydrogen in a treating zone, maintaining temperatures of from about 700° to 1100° F. and pressures of about 500 to 10,000 p.s.i. in said zone, and recovering an aromatic fraction substantially depleted in alkylated side chains.

6. The process of claim 5 wherein said petroleum fraction is a gas oil.

7. The process of claim 5 wherein said fraction is a catalytic naphtha.

8. The process of claim 5 wherein said metal is selected from the class of cobalt and nickel.

9. An improved process for aromatizing dilute olefinc naphtha streams which comprises vaporizing said stream, passing said vaporized stream through a bed of crystalline metallic alumino-silicate zeolite having a uniform pore opening of about 6 to 15 Angstroms, adsorbing said olefins from said naphtha at a temperature of about 250° to 450° F., withdrawing unadsorbed naphtha components, thereafter heating said zeolite and adsorbed olefins to about 500° to 800° F. and recovering high yields of aromatics.

References Cited in the file of this patent

UNITED STATES PATENTS

| 1,728,732 | Jaeger | Sept. 17, 1929 |
| 2,109,866 | Moser | Mar. 1, 1938 |
| 2,317,803 | Reeves et al. | Apr. 27, 1943 |
| 2,834,429 | Kinsella et al. | May 13, 1958 |
| 2,858,901 | Fort | Nov. 4, 1958 |
| 2,904,607 | Mattox et al. | Sept. 15, 1959 |
| 2,916,437 | Gilbert | Dec. 8, 1959 |